United States Patent [19]

Yamaguchi et al.

[11] Patent Number: 5,120,296
[45] Date of Patent: Jun. 9, 1992

[54] METHOD AND APPARATUS FOR FORMING FILTER ELEMENT

[75] Inventors: Yoshimitsu Yamaguchi, Anjo; Masanori Suzuki, Kariya; Kanekiyo Narita, Toyoda; Akira Masuda, Kariya; Yasuo Hibi, Nagoya; Takayuki Suzuki, Kariya, all of Japan

[73] Assignee: Nippondenso Co., Ltd., Kariya, Japan

[21] Appl. No.: 598,775

[22] Filed: Oct. 18, 1990

Related U.S. Application Data

[63] Continuation of Ser. No. 348,094, May 2, 1989, abandoned, which is a continuation of Ser. No. 71,711, Jul. 9, 1987, abandoned.

[30] Foreign Application Priority Data

| Jul. 18, 1986 | [JP] | Japan | 61-168144 |
| Jul. 21, 1986 | [JP] | Japan | 61-169935 |
| Aug. 14, 1986 | [JP] | Japan | 61-189642 |
| Sep. 3, 1986 | [JP] | Japan | 61-205786 |
| Sep. 3, 1986 | [JP] | Japan | 61-205788 |

[51] Int. Cl.⁵ ............... B31F 1/20; B65H 45/20; B65H 45/28
[52] U.S. Cl. ............... 493/352; 493/353; 493/362; 493/941
[58] Field of Search .......... 493/295, 304, 352, 353, 493/354, 355, 356, 357, 359, 419, 433, 447, 448, 451, 454, 458, 462, 463, 466, 941

[56] References Cited

U.S. PATENT DOCUMENTS

| 3,077,148 | 2/1963 | Mumby | 493/352 |
| 3,406,959 | 10/1968 | Ross | 493/359 |
| 3,514,364 | 4/1970 | Yamaguchi | 156/596 |
| 3,518,810 | 7/1970 | Steeve | 493/304 |
| 3,948,712 | 4/1976 | Stannaro | 493/941 |
| 4,073,485 | 2/1978 | Gregoire et al. | 493/353 |
| 4,151,699 | 5/1979 | Focke et al. | 83/49 |
| 4,181,070 | 1/1980 | Robbins et al. | 493/355 |
| 4,290,592 | 9/1981 | Kastner | 493/356 |
| 4,571,237 | 2/1986 | Vogtlander | 493/451 |
| 4,718,884 | 1/1988 | Iwase et al. | 493/419 |

FOREIGN PATENT DOCUMENTS

| 485644 | 8/1936 | United Kingdom . |
| 910233 | 11/1962 | United Kingdom . |
| 984788 | 3/1965 | United Kingdom . |
| 1019543 | 2/1966 | United Kingdom . |

*Primary Examiner*—William E. Terrell
*Attorney, Agent, or Firm*—Cushman, Darby & Cushman

[57] ABSTRACT

A tape like material including synthetic resin for a filter element is bent into a corrugated pattern while the material is passed between pairs of forming and cutting rollers. Since pairs of cutters are provided within the rollers and since guide plates are provided around the rollers, the material is held abutting the rollers even when the material is cut by the cutters. The material is then conveyed within a reducing drum. The pitch of the corrugated portions formed on the material is reduced and the material is formed into a semicircular shape within the reducing drum. After passed the reducing drum, the material is transferred to a forming path. Since the forming path has an introducing portion having a semicircular sectional shape similar to that of the material leaving the reducing drum, an outlet portion having a circular sectional shape similar to that of the finished filter element and an intermediate portion having a sectional shape gradually varied from the shape of the introducing portion to the shape of the outlet portion, the material is shaped to a complete circle while the material travels along the forming path. A crystal type filter element is thus formed from a tape like material automatically.

7 Claims, 18 Drawing Sheets

1st cutting area

2nd cutting area

F IG. 16
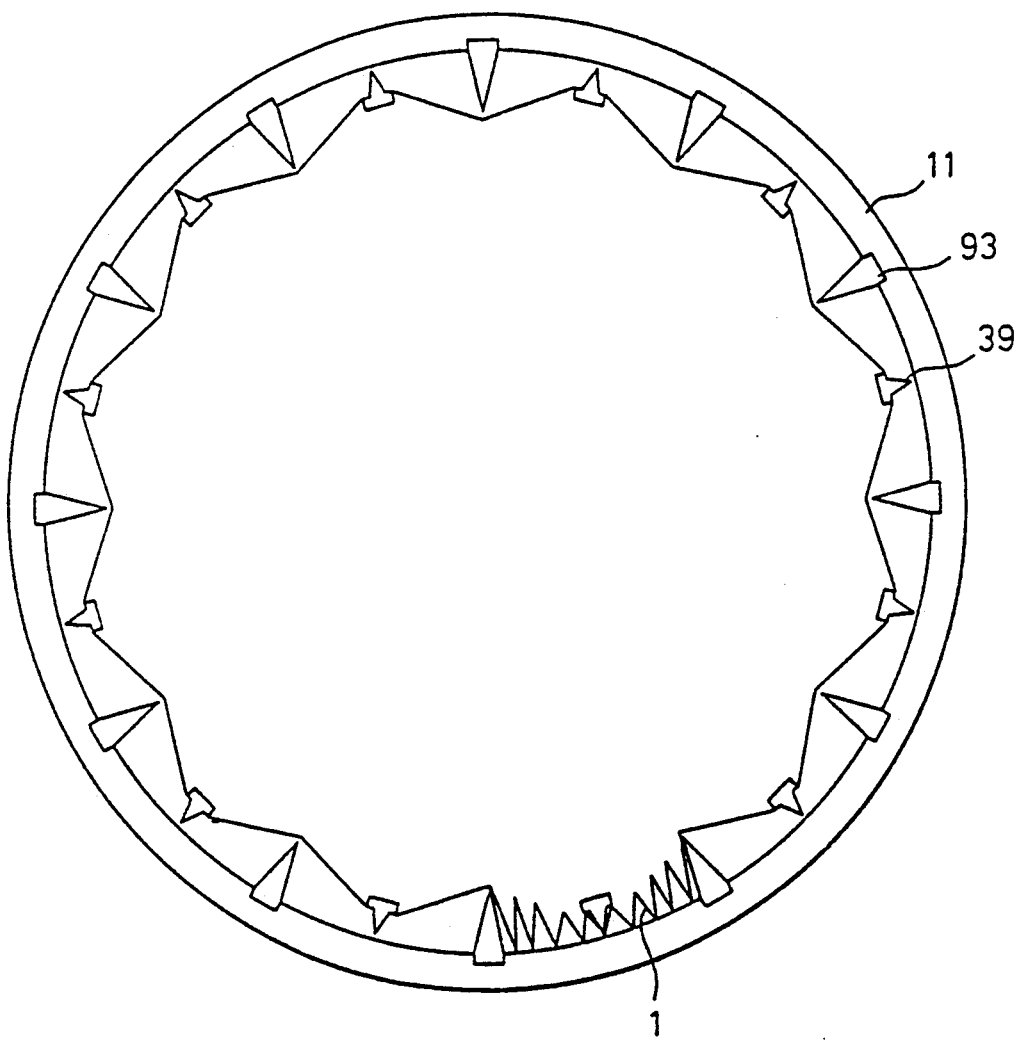

METHOD AND APPARATUS FOR FORMING FILTER ELEMENT

This is a continuation of application Ser. No. 07/348,094, filed on May 2, 1989, which was abandoned upon the filing hereof and which was a continuation of application Ser. No. 07/071,711, filed Jul. 9, 1987, abandoned.

FIELD OF THE INVENTION

The present invention relates to a method and apparatus for forming filter elements by bending a tape like filter material. The filter element according to the present invention may be used as an oil filter or an air filter for an automotive engine.

BACKGROUND OF THE INVENTION

The conventional type of filter element is made from a tape like material to which synthetic resin is permeated. After the material is bent to a serpentine form, the wavy material is rounded and connected at both ends to form a ring. The material is then supported by a supporting member which is provided at an inner side of the ring shaped material. Finally, the shape of the material is fixed by hardening the resin.

The filter element having the shape shown in FIG. 21 may be used as an air filter for an automotive engine. However, the so called "crystal type" filter element similar to the filter shown in FIG. 22, has become a more popular automotive air filter design instead of the filter design shown in FIG. 21, since the crystal type filter works more effectively.

The crystal type filter element has a plurality of wavy portions with the width of the wavy portions gradually varied. The sets of wavy portions thus create filtering cores which are arranged circularly so that a group of filtering cores make a ring.

Since the crystal type filter element has such a complicated shape, which is not easily produced, a method and apparatus for automatically forming the crystal type filter element is needed.

SUMMARY OF THE INVENTION

The object of the present invention is to provide an effective method and apparatus for forming so called crystal type filter elements.

In order to attain the above described object, the present invention forms corrugated portions from a tape like material while passing the tape like material through coupled rollers having knurls. The present invention then cuts the material while the tape like material is held abutting the rollers. Finally, the present invention forms the material by reducing the pitch of the corrugated portions and rounding the material.

The above described method is carried out by a forming apparatus comprising a couple of forming and a couple of cutting rollers having knurls at their outer surfaces and cutters within, a limiting member limiting the filter material at the position where the width of the corrugated portions is maximized and at the position where the width of the wavy portions is minimized, a conveying unit conveying the tape like material intermittently, a reducing drum reducing the interval between adjacent pairs of corrugated portions and rounding the material semicirularly, and a forming device including an introducing portion having the same sectional shape as the preliminarily formed material, an outlet portion having the same sectional shape as that of the final shape of the filter element and a forming path connecting the introducing portion and the outlet portion and having a sectional shape gradually varied from the shape at the introducing portion to the shape at the outlet portion.

BRIEF DESCRIPTION OF DRAWINGS

FIG. 16 is a front view showing the position of the material within the reducing drum;

DETAIL DESCRIPTION OF THE PREFERRED EMBODIMENT

Outline of Forming Steps

An outline of the forming steps of the present invention for forming a filter element is described below.

Figure 1:
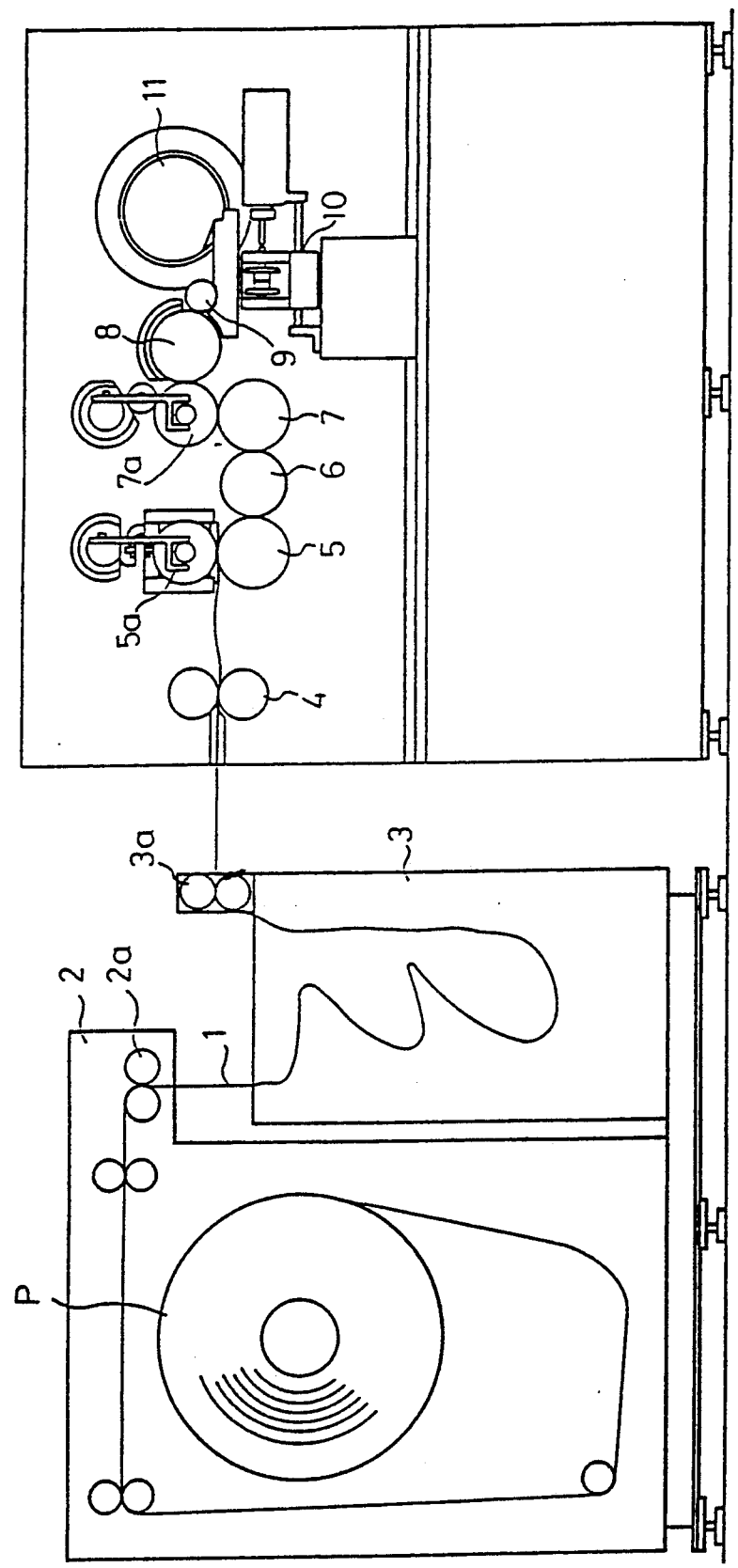
FIG. 1 is a side view showing a forming apparatus according to the present invention.
Figure 15:
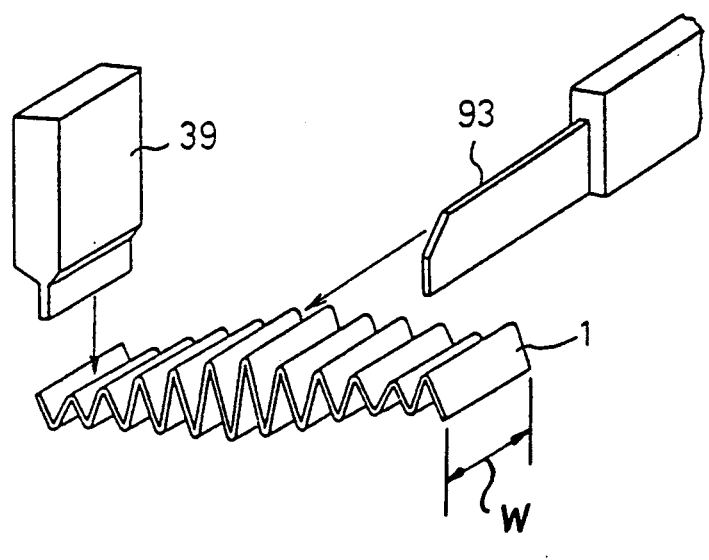
FIG. 15 is a perspective view showing a positioner.

Referring to FIG. 1, a tape like material 1 having a width shown in FIG. 15, is uncoiled from a package P by an uncoiler 2 which has a plurality of first supplying rollers 2a. The material 1 is stocked within a stocker 3 before the material is conveyed toward a couple of rollers 4 by a conveying roller 3a. The couple of rollers 4 have knurls at their outer peripheral edges and are mechanically connected to each other. The knurls make lines on both sides of the material 1 while the material 1 is passed through the couple of rollers 4.

The material 1 is then conveyed toward a forming and cutting mechanism including a first forming roller 5, a first cutting roller 5a, a first idle roller 6, a second forming roller 7, and a second cutting roller 7a. The material 1 is formed to a serpentine shape and is cut while the material 1 is passed through the forming and cutting mechanism. The material 1 is then conveyed toward a second supplying roller 9 via a second idle roller 8. The second supplying roller 9 conveys material 1 toward reducing drum 11 via a reducing device 10 such that the material is bent and held within the reducing drum 11.

Figure 2:
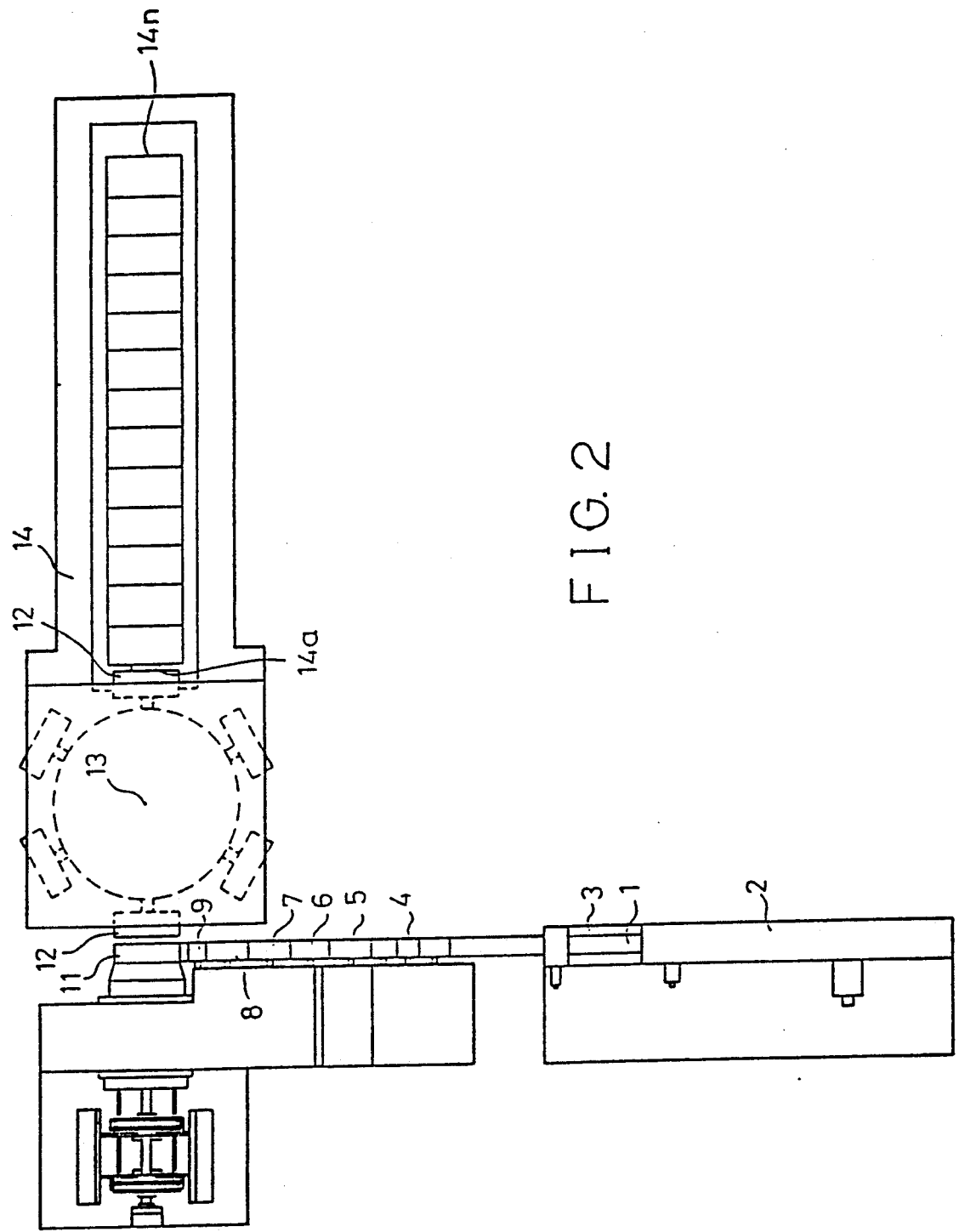
FIG. 2 is a top view of the apparatus shown in FIG. 1.

Referring to FIG. 2, after passing the reducing drum 11, the material 1, formed semicircularly, is transmitted toward a transfer device 12 provided within an index device 13. The transfer device 12 transmits the material 1 toward a forming path 14 where the material is formed into a circular shape while it is being conveyed from an introducing portion 14a to an outlet portion 14n.

The detail of each of these steps of the present invention is described below.

Forming and Cutting Step

Figure 3:
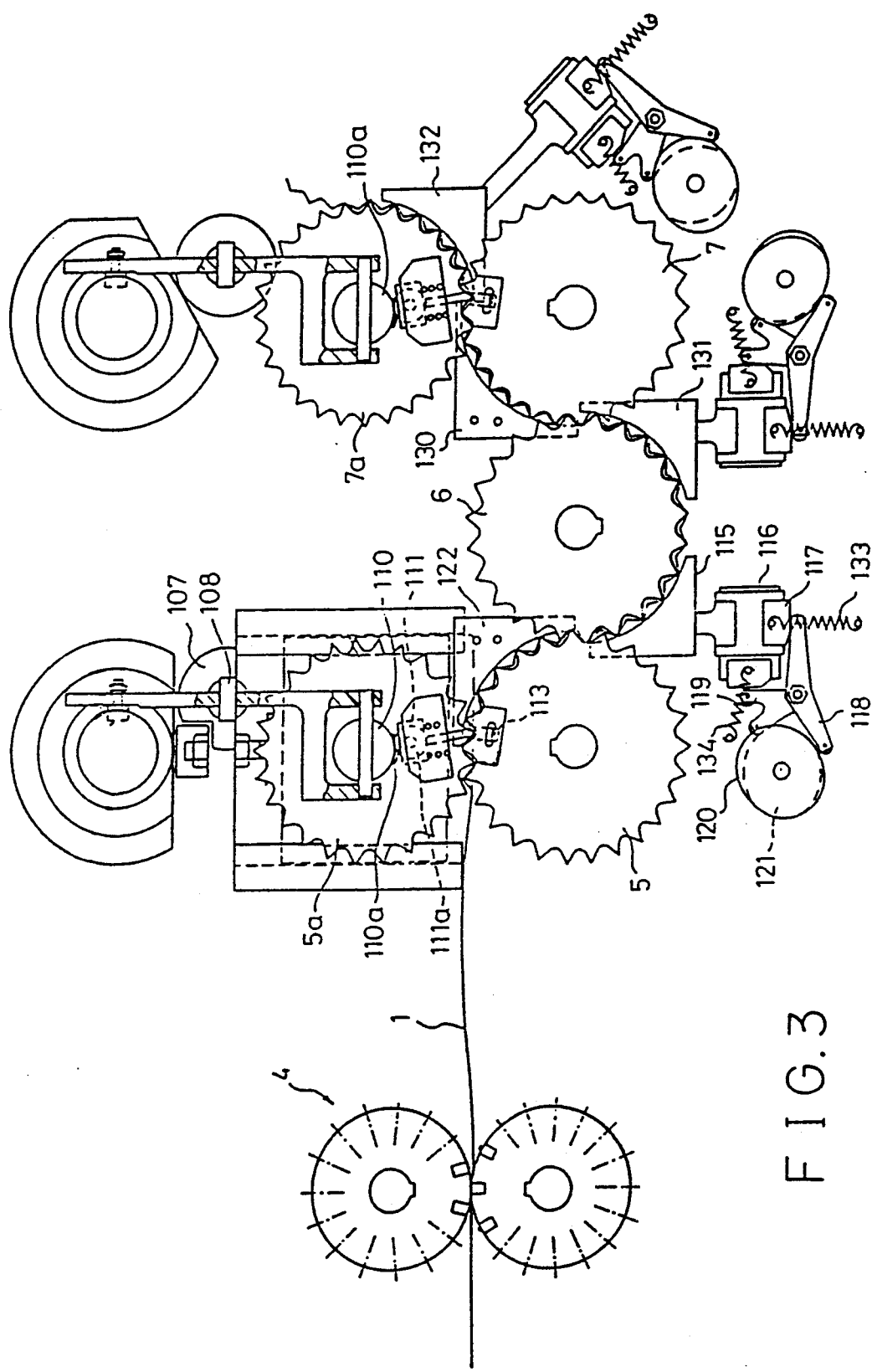
FIG. 3 is a side view showing forming and cutting rollers.

As shown in FIG. 3, a plurality of lines are formed on both front and rear sides of the material by the knurls of the rollers 4, so that the material 1 is prepared for the forming and cutting step. Both the first forming roller 5 and the first cutting roller 5a have a width substantially equal to the width of material 1. Both rollers 5 and 5a have outer surfaces on which a plurality of (15 in this embodiment) concave and convex portions are provided. The intervals between adjacent pairs of the convex portions are identical with the pitches of the corrugated portions formed on the material 1. The convex portions of one roller 5 or 5a are inserted into the concave portions of the other roller 5a or 5 so that the rollers 5 and 5a are mechanically connected with each other and rotated simultaneously. In order to be rotated simultaneously, the summits of the convex portions of one roller 5 or 5a and valleys of the concave portions of the other roller 5a or 5 should be located on imaged circles, the diameter of both imaged circles being equal. It should be noted that the mechanical connection between every other pair of rollers is similar to that of the rollers 5 and 5a.

Figure 12:
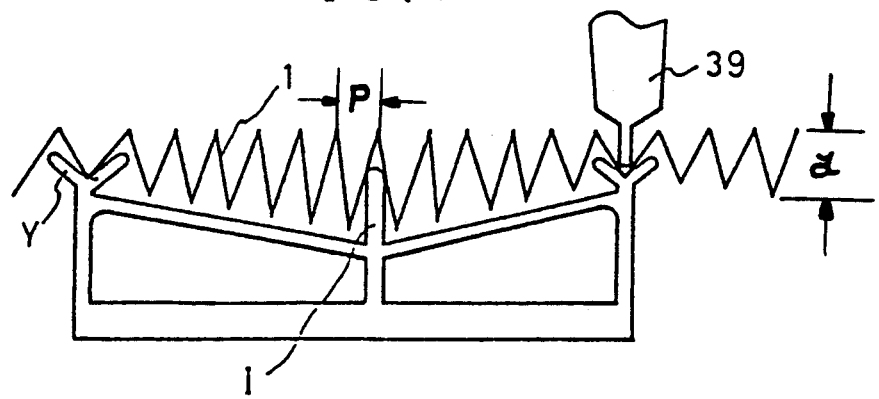
FIG. 12 is a side view explaining a conveying step of the material.

The material 1 is held between the first forming roller 5 and the first cutting roller 5a in such a manner that the preliminarily formed line, which was formed by the knurls of the rollers 4, is identical with the summit of the convex portion and the valley of the concave portion. The material 1 is then moved by the rotation of the rollers 5 and 5a. The material 1 is then supplied between the second forming roller 7 and the second cutting roller 7a via the idle roller 6 which is mechanically connected with the first forming roller 5 and the second forming roller 7. As shown in FIG. 12, the formed material has a pitch "p" and a gradually varying amplitude "a".

In order to maintain the material 1 against the outer surface of the rollers 5, 6 and 7, guide plates 122, 115, 131, 130 and 132 are provided near the rollers 5, 6 and 7. Since the summit of the convex portions of the forming rollers 5 and 7 are located on the imaged circle, the inner surface of the guide plate 122 and 130 may not be varied. On the other hand, since the valley of the concave portion of the idle roller 6 is located on the imaged circle, the outer diameter of the idle roller 6 is varied along with circumferential peripheral thereof so that the guide plates 115, 131, 132, which face the idle roller 6 and the second cutting roller 7a, are oscillated in accordance with the rotation of the rollers 6 and 7a.

Figure 4:
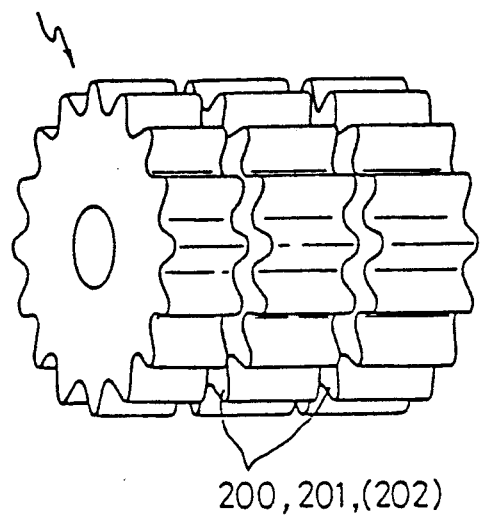
FIG. 4 is a perspective view of the forming and cutting roller.

The movable guide plate 115 has a circular portion which faces the idle roller 6. The guide place 115 is fixed on a first movable slider 117 which can slide vertically in view of FIG. 3. The first slider 117 is mounted on a second movable slider 116 which can slide horizontally in view of FIG. 3. Both slider 116 and 117 are moved simultaneously by levers 119 and 118 with both levers 119 and 118 being correspondingly controlled by cams 121 and 120. The horizontal and vertical movement of the sliders 116 and 117 make the guide plate 115 oscillate in order to keep the gap between the summit of the convex portion of the idle roller 6 and the circular portion of the guide plate 115 within a predetermined distance. Numerals 133 and 134 show return springs which are biased against the levers 118 and 119. The first forming roller 5 and the first cutting roller 5a have a couple of annular grooves 200 and 201 as shown in FIG. 4. Since the depth of the annular grooves 200 and 201 are deeper than the depth of the valley of the concave portion formed on the outer surface of the rollers 5 and 5a, the material is prevented from touching with the rollers 5 and 5a at the portion of the annular grooves 200 and 201 even though the material is held between the rollers 5 and 5a. The end portion of the guide plate 122 is inserted within the annular grooves 200 and 201 so that the material 1 is guided even at the position where the rollers 5 and 5a are connected to each other. It should be noted that the guide plate is formed by a couple of plates each of which is inserted within the grooves 200 and 201 respectively.

A couple of annular grooves 202 are also formed on the outer surface of the idle roller 6 so that one end of the guide plate 122 is inserted into the grooves 202 of the rollers 5 and 5a and the other end is inserted into the grooves 202 of the idle roller 6.

Figure 5:
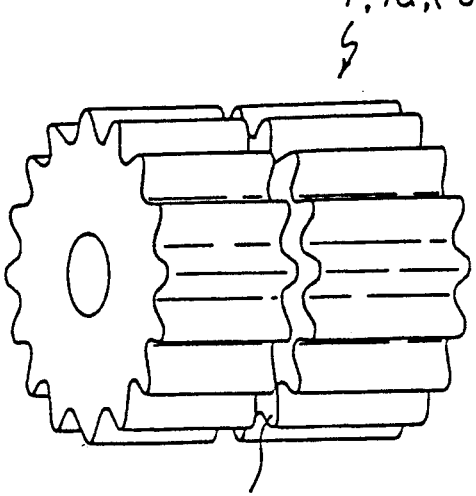
FIG. 5 is a perspective view showing second forming and cutting rollers.

Annular grooves 203 and 204 are formed on the outer surface of the second forming roller 7 and the second cutting roller 7a as shown in FIG. 5. The idle roller 6 also has a third annular groove 205 so that the idle roller 6 has three grooves. The end portions of each of the guide plates 131, 130 and 132 are inserted within these grooves in order to improve the transmission of the material between the first forming roller, the first cutting roller 5a and the idle roller 6. In other words, the guide plates 131, 130 and 132 are aligned.

The cutting operation by the cutting rollers is described below. The tape like material 1 should be cut at a predetermined length after the material 1 is bent into corrugated portions. A couple of cutters are provided in the first forming roller 5 and the first cutting roller 5a so that the cutters cut the material when the cutters face each other. The cutters of the first couple of rollers 5 and 5a, however, do not cut the material 1 completely so the guide plate 122 may remain inserted in the grooves 200 and 201 of the rollers 5 and 5a while the rollers 5 and 5a bite against each other. The cutters of the present invention are thus located at predetermined positions, one position between the first forming roller 5 and the first cutter roller 5a and another position between the second forming roller 7 and the second cutting roller 7a. Namely, the cutters provided at the first cutting roller 5a and the first forming roller 5 cut a part of the material, and the other cutters provided at the second cutting roller 7a and the second forming roller 7 cut the remaining part of the material 1 in order to completely cut the material.

Figure 6:
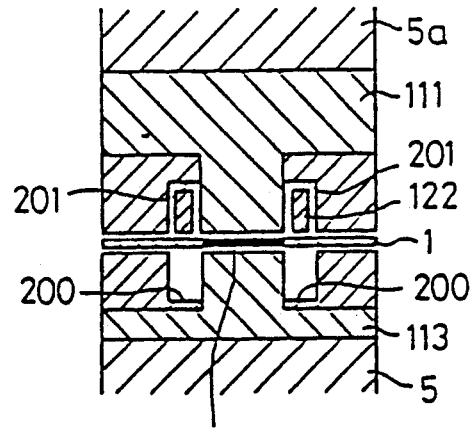
FIG. 6 is a sectional view showing a first cutting area.
Figure 7:
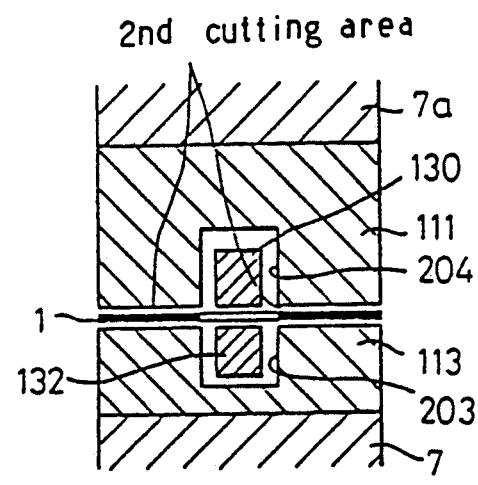
FIG. 7 is a sectional view showing a second cutting area.

As shown in FIG. 6, the first cutters provided in the first forming roller and the first cutting roller 5a cut at approximately the central third of the material 1. The material 1 is conveyed toward the first idle roller 6 via the guide plate 122 which is inserted in grooves 200 and 201 of the rollers 5 and 5a, next to but away from the position where the cutter in the first cutting roller cuts the material. As shown in FIG. 7, the second cutter provided in the second forming roller 7 and second cutting roller 7a cut approximately the right and left thirds of the material, which parts were not cut by the first cutter. The material 1 is guided by the guide plate 132 which is inserted within the grooves 203 and 204 of the rollers 7 and 7a, next to but away from the portion where the second cutter cuts the material.

Figure 8:
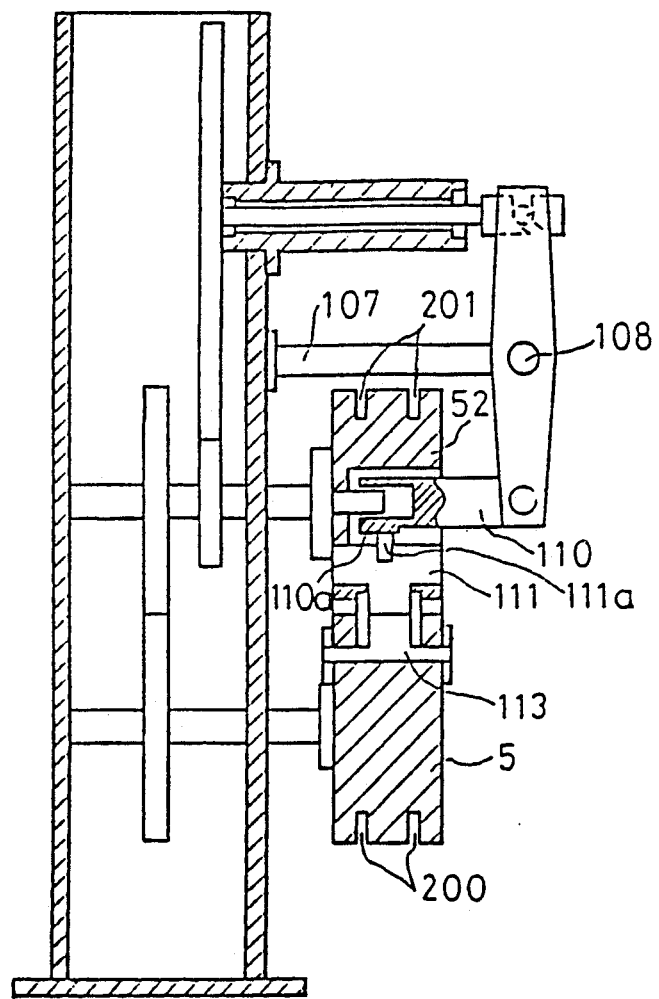
FIG. 8 is a sectional view showing a cutting mechanism.
Figure 9:
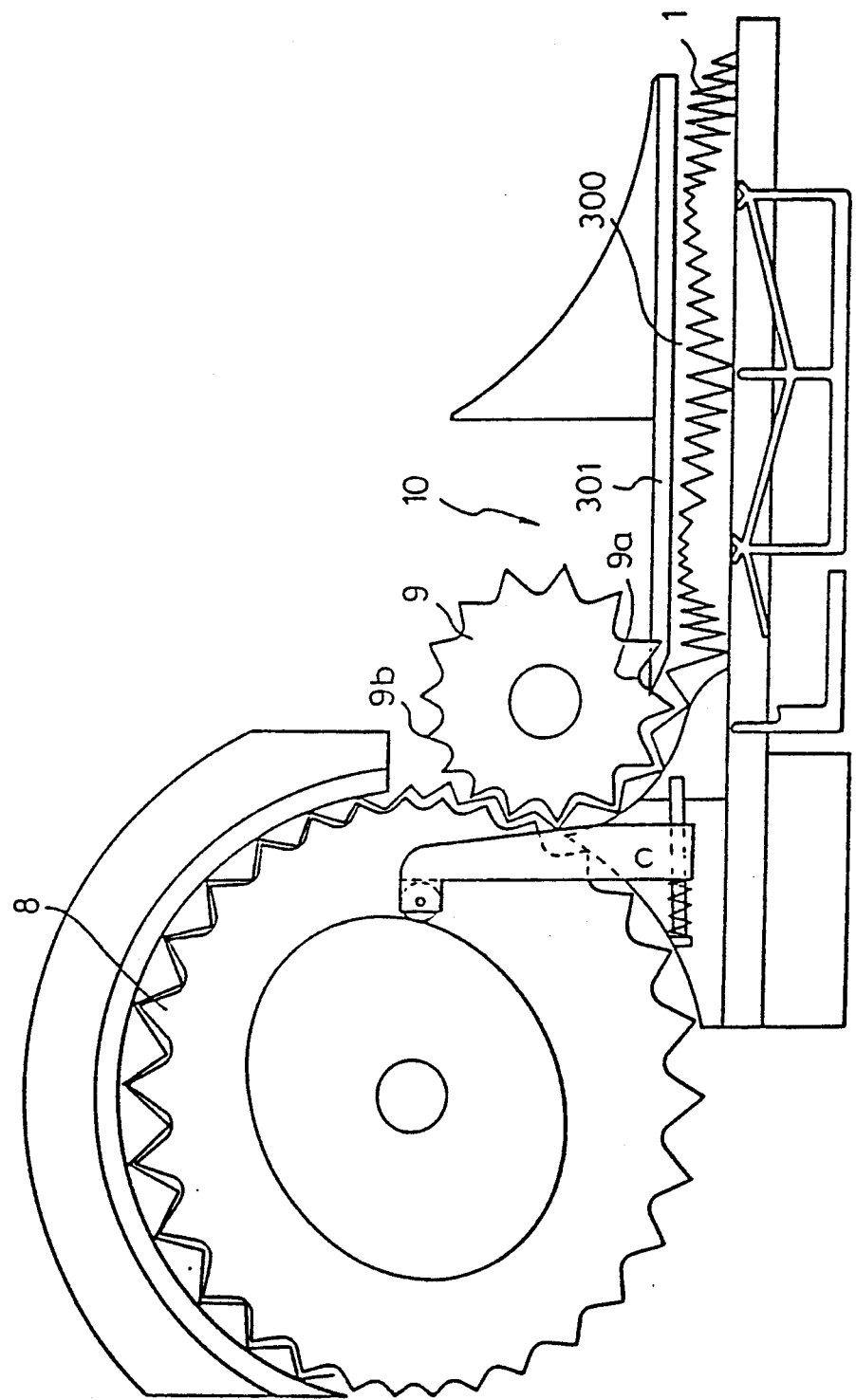
FIG. 9 is a side view showing a conveying mechanism.
Figure 10:
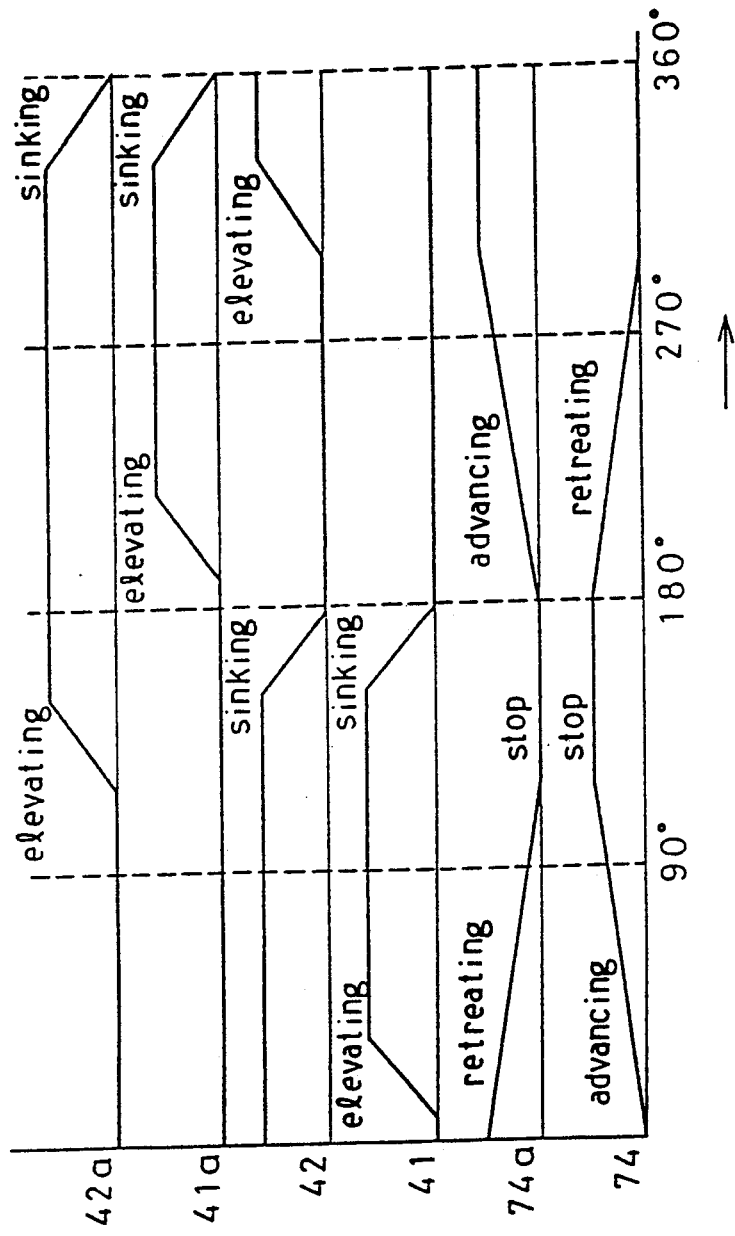
FIG. 10 is a diagram explaining the timing of the movement of the conveying unit.
Figure 11:
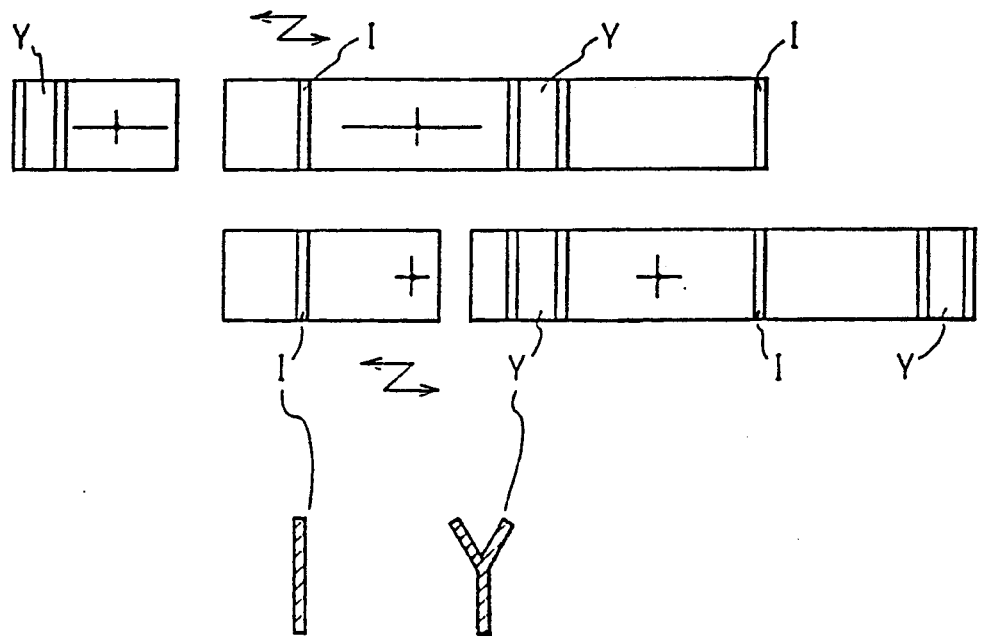
FIG. 11 is a top view showing an arrangement of the limiting plates.

The detail of the cutting mechanism is described below in reference to FIGS. 3 and 8.

The male cutter 111 is provided within a bore formed in the first cutting roller 5a. The end portion of the male cutter 111 can be inserted within the opening which is formed at the valley of the concave portion formed on the outer surface of the roller 5a. The male cutter 111 is located at the central portion of the roller 5a in order to cut the central portion of the material 1 as described above. As shown in FIG. 8, the base portion of the male cutter 111 contacts a cam 110 which is inserted into the roller 5a at a longitudinal axis via a contacting member 111a. The male cutter 111 rotates along with the cam 110 in accordance with the rotation of the roller 5a. The cam 110 does not rotate with the roller 5a but moves along the longitudinal axis of the roller 5a. When the cam 110 moves right-wordly in view of FIG. 8, a projecting portion 110a formed at the end of the cam 110 is connected with the contacting member 111a. When the contacting member 111a contacts the cam other than at the projecting portion 110a, the male cutter 111 does not move and the roller 5a is located so that the top portion of the male cutter 111 is hidden within the roller 5a. The male cutter 111 projects from the opening of the roller 5a toward the outer surface of the roller 5a when the projecting portion 110a contacts member 111 Since the projecting portion 110a is formed at a predetermined position where the roller 5a bites with roller 5, the male cutter 111 projects at the contacting portion between the rollers 5 and 5a.

The female cutter 113 is fixed within the inner side of the first forming roller 5a and the receiving portion of the female cutter 113 opens to the valley portion of the concave portion of the roller 5. The female cutter 113 faces the male cutter 111 when the rollers 5 and 5a are rotated simultaneously. Accordingly, when the male cutter 111 is operating, the male and female cutters 111 and 113 out the central portion of the material 1.

Figure 13:
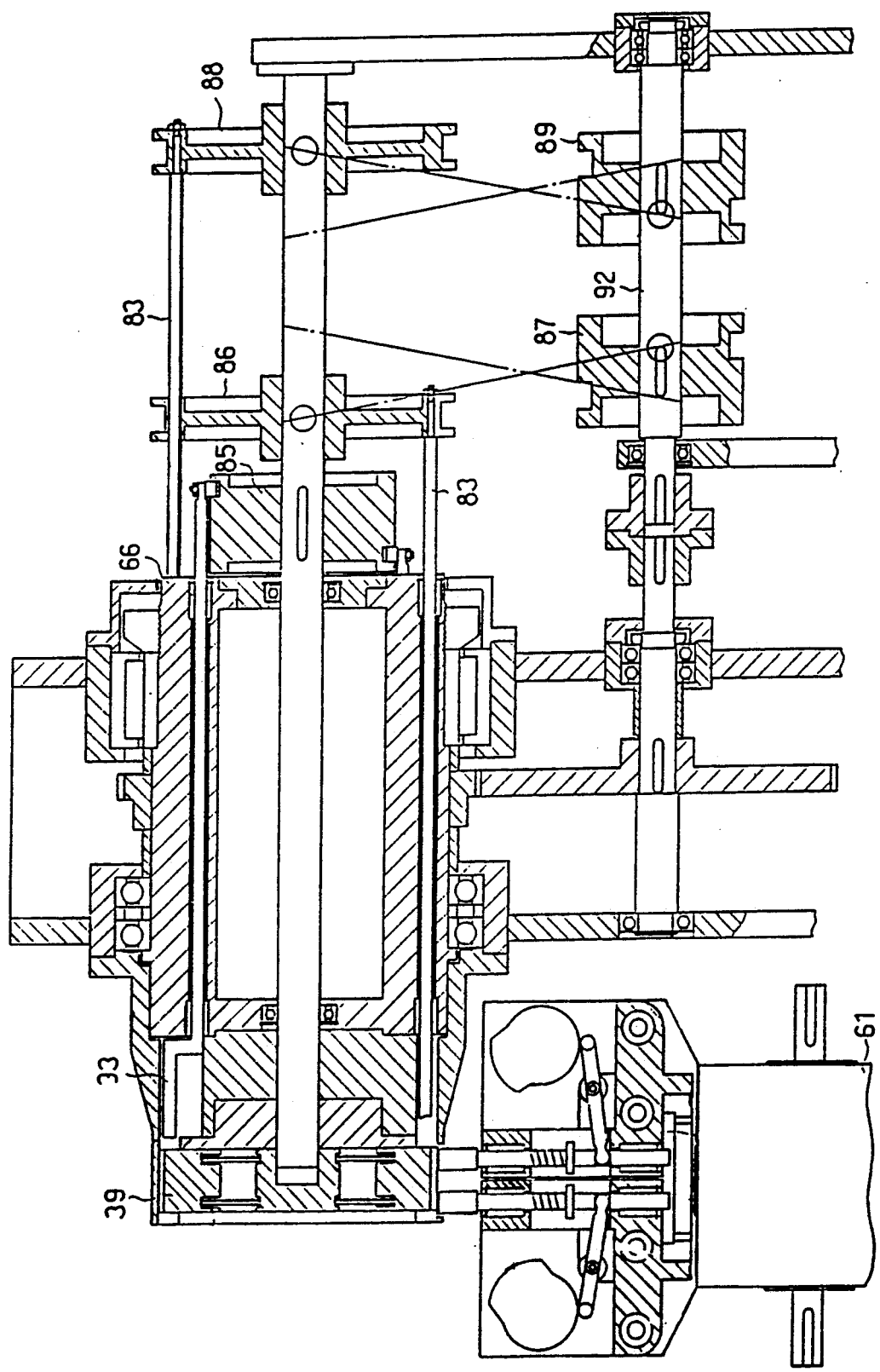
FIG. 13 is a sectional view showing the conveying device and a moving mechanism for moving a reducing drum.
Figure 14:
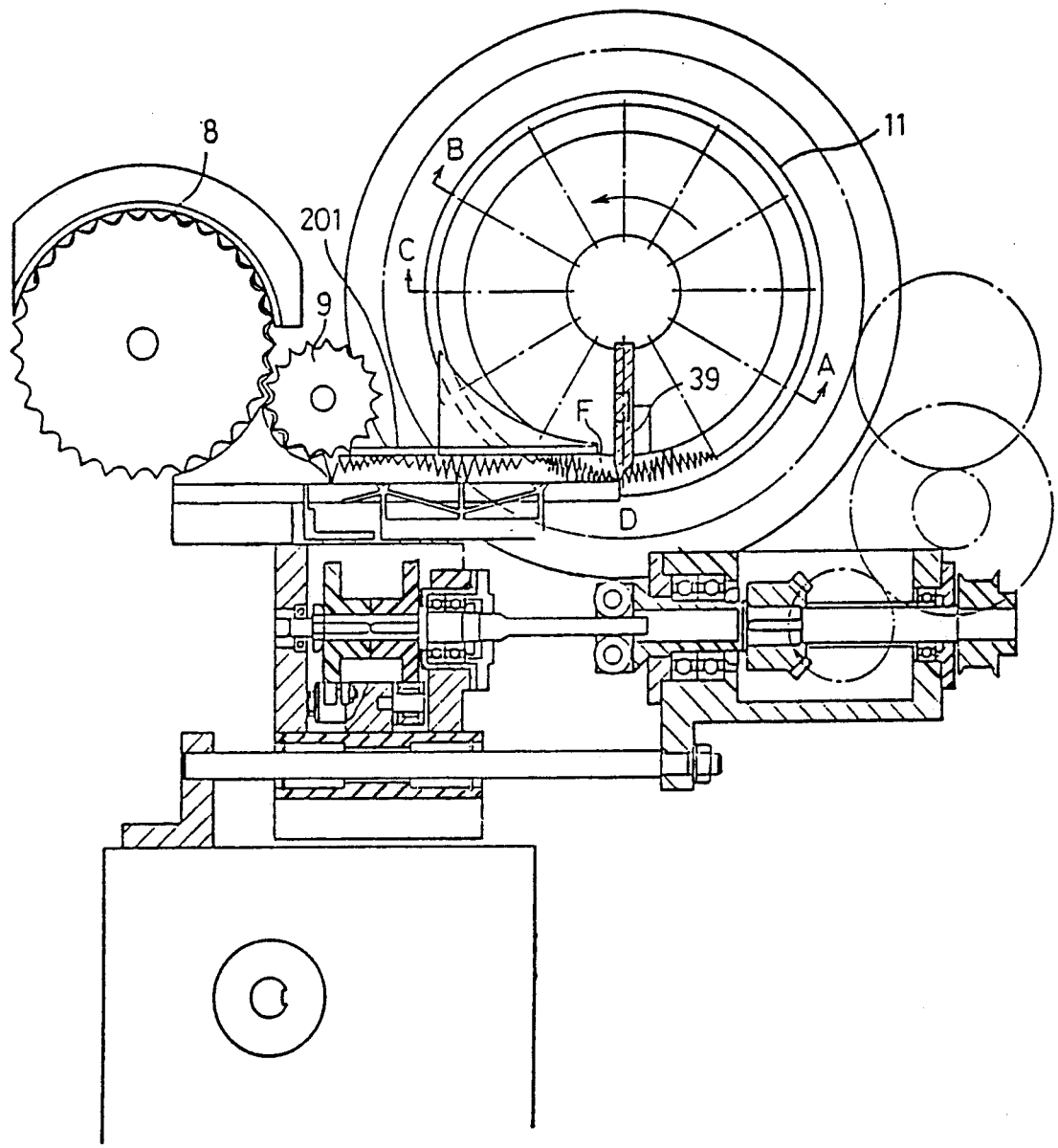
FIG. 14 is a front view of the mechanism shown in FIG. 13.

The mechanism moving the male cutter 111 is described with reference to FIG. 13. The end portion of the cam 110 is connected to a lever which is pivoted at the central portion thereof to fixing shaft 107 via a pin 108. Twenty four rods 83 and 83a which push the material 1 out from the reducing drum 11 are provided within the drum 11 at the position between a positioning hook 39 and a positioner 93 in such a manner that the rods 83 and 83a are inserted within the main shafts 66. Rings 86 and 88 which are slidably connected with the fixed shaft 66 are connected with the rods 83 and 83a and the rings 86 and 88 so that the rings 86 and 88 can be reciprocated by the cam 87 and 89 which is connected with cam shaft 92. The rods 83 and 83a, which are located at a half portion of the reducing drum 11, advance when the material 1 of the filter elements, held within the reducing drum, is located at such position that the front portion of the material 1 reaches to the position B (shown in FIG. 14) and the end position of the material 1 reaches position A. The rods 83 and 83a push the material 1 leftwardly in view of FIG. 13 for transmitting the material 1 towards the transfer device (not shown) as the drum 11 rotates from position B to position C.

As described above, the material held within the reducing drum 11 is transmitted toward the transmitting device 12 by the rods 83 and 83a. During the transmitting operation, the semicircular shape of the material 1 created by the drum 11 of the present invention is maintained.

The cam shaft 92 can rotate synchronously with the rotation of the main shaft 66 with the proportion between the rotating speed of the supplying roller 9 and the rotating speed of the reducing drum 11 being 12:1.

Since the elevating timing and the advancing timing of the supply unit is synchronized with the rotation of the supplying roller, the zigzag shaped materials can be transmitted towards the reducing drum without altering the zigzag shape. And since the material is introduced into the drum by the positioning hook 39 and the positioner 93 in such a manner that the shape of the material is maintained, the material can be shaped semicircularly within the reducing drum without deforming its zigzag shape.

Rounding Step

Figure 17B:
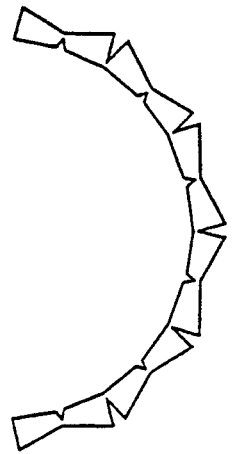
FIGS. 17A-17N are front views showing the forming step of the material within a forming path.
Figure 17D:
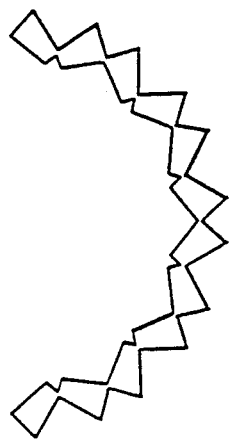
Figure 17F:
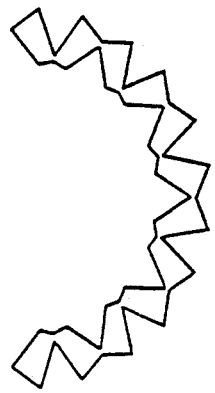
Figure 17A:
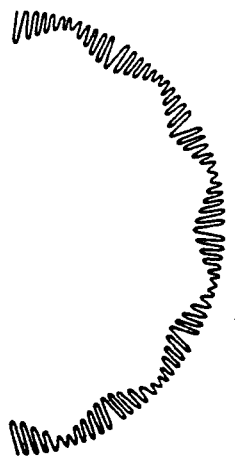
Figure 17C:
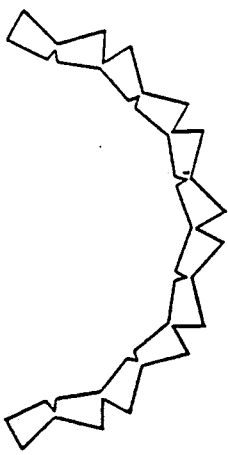
Figure 17E:
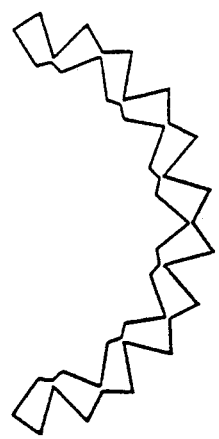
Figure 17:
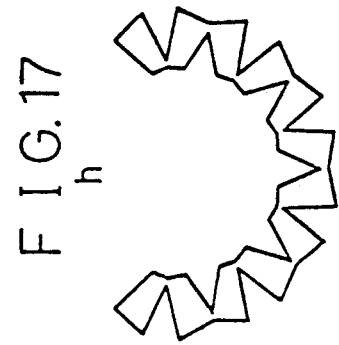
Figure 17:
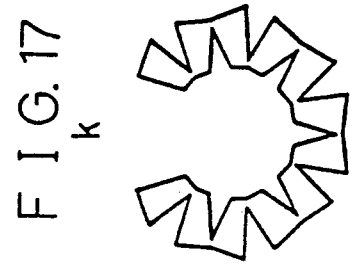
Figure 17:
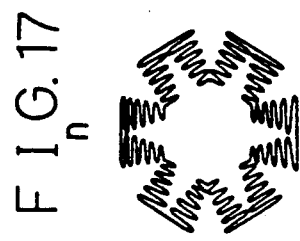
Figure 17:
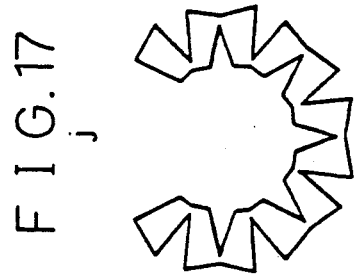
Figure 17:
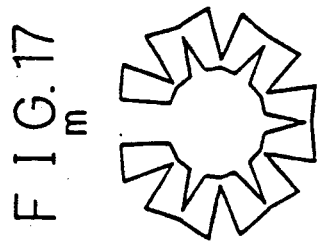
Figure 17:
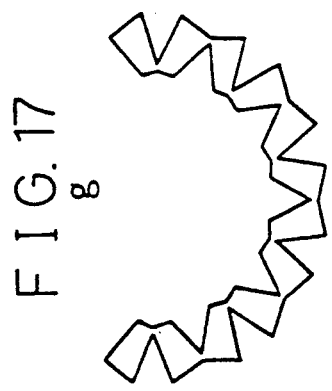
Figure 17:
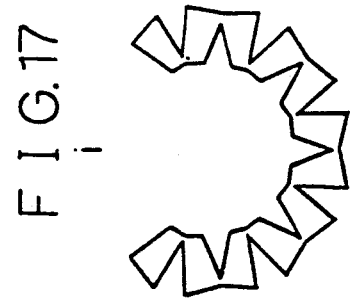
Figure 17:
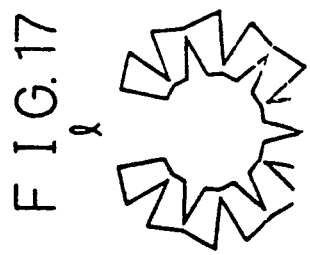

The material 1 has a semicircular shape as shown in FIG. 17a when the material 1 is transmitted from the reducing drum 11 to the transmitting device 12. The semicircular material (shown in FIG. 17a) is then rounded during the rounding step to completely shape the circle (as shown in FIG. 17n).

Figure 18:
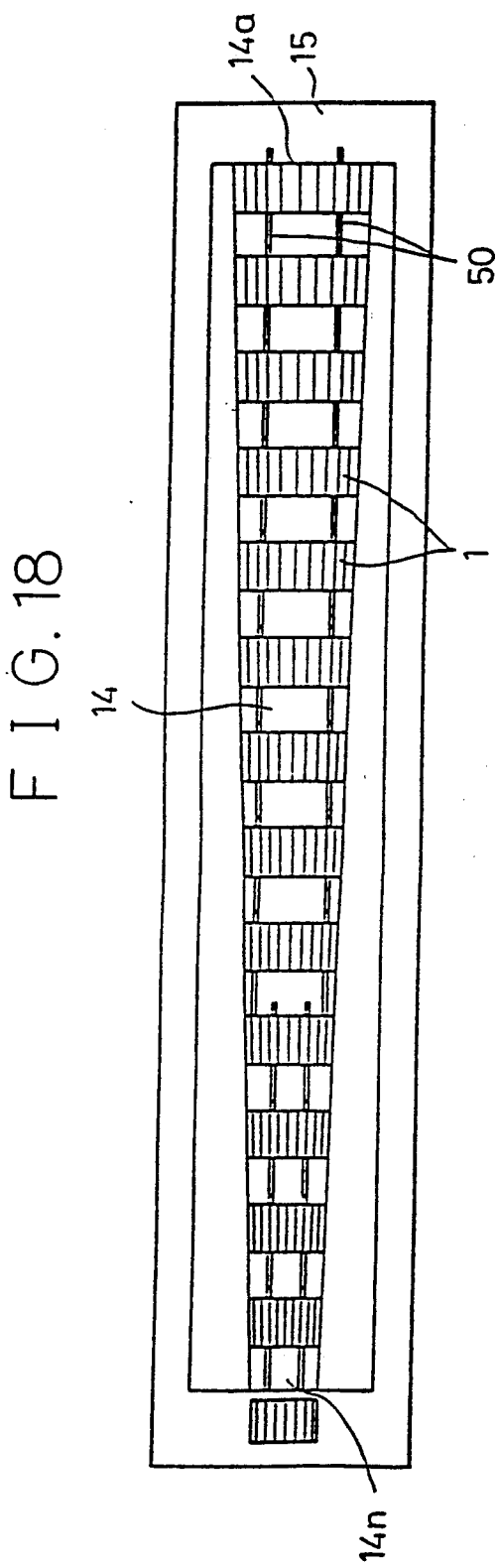
FIG. 18 is a front view of the forming path.
Figure 19:
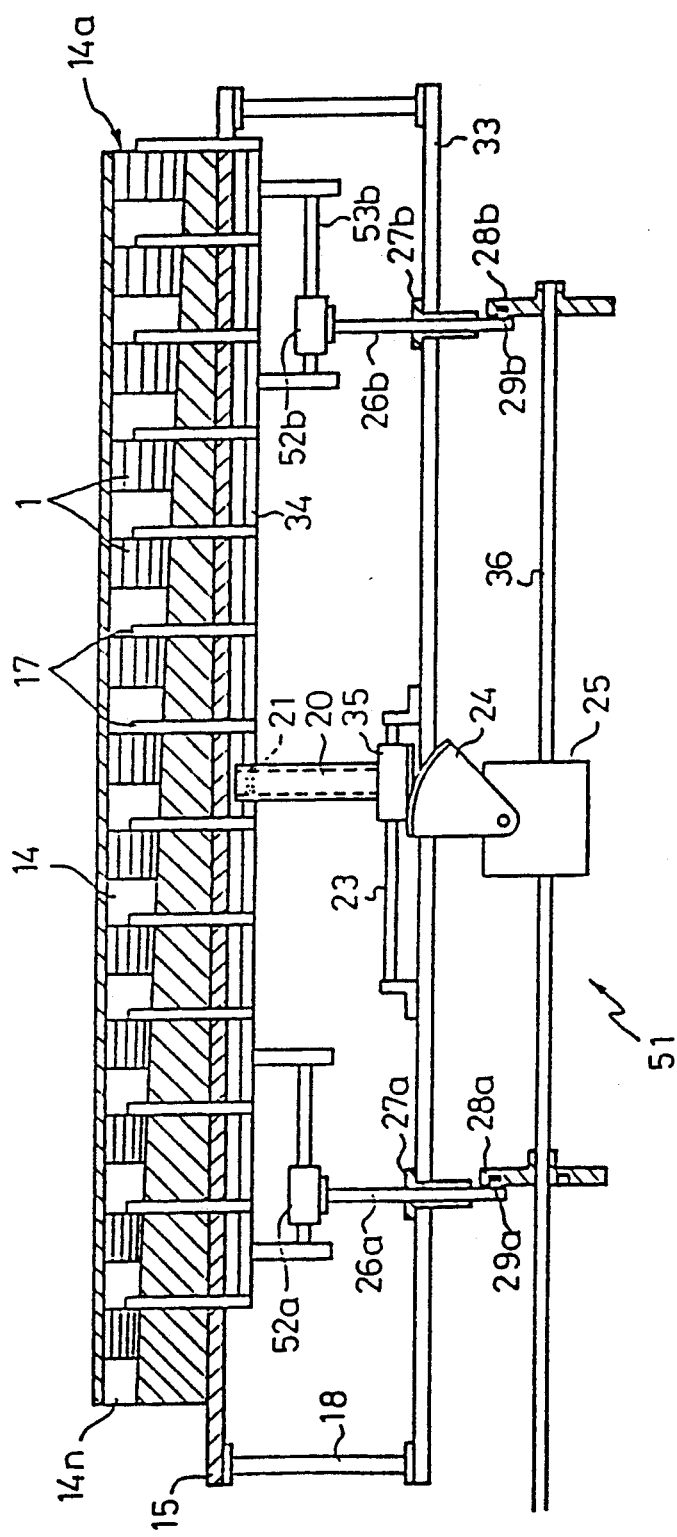
FIG. 19 is a side view of the forming path.

After the material 1 is transmitted toward the transmitting device 12, which is located at the opposite position of the reducing drum 11, the index device 13 rotates by a predetermined angle in order to make the advanced transmitting device 12 fit to the forming path 14 as shown in FIG. 2. The forming path 14 is mounted on base plates 15 and is tapered from the introducing position 14a toward the outlet portion 14n as shown in FIGS. 18 and 19. Namely, the space 1' (shown in FIG. 20), the shape of which is similar to the material as shown in FIGS. 17a-17n, is provided within the forming path 14. The base plate 15 has a couple of grooves 50 provided along the path 14. A conveying bar 34 is provided under the base plate 15 along the path 14. A plurality of pairs (13 pairs) of conveying hooks 17 are connected with the conveying bar 34 in such a manner that the intervals between adjacent pairs of conveying hooks 17 are equal. Since the conveying bar 34 is connected with the transferring mechanism 51, the conveying bar 34 intermittently moves in an elevating, advancing, sinking and retreating sequence. The conveying hook 17 can be inserted into the material within the forming path 14 at the space between the wavy portions, through the groove 50, while the conveying bar 34 elevates. The conveying hook 17 pushes the material within the forming path 14 while the conveying bar 34 advances. The conveying hook 17 releases the material within the path 14 when the conveying bar 34 moves downwardly, and the conveying hook returns to the starting position when the conveying bar 34 retreats. The advancing and retreating distance of the conveying bar 34 is equal to the pitch between adjacent conveying hooks 17. These movements of the conveying hooks 17 transfer the material, which is introduced into the forming path 14 from the transmitting device 12, towards the outlet portion 14n of the path 14. During the movement of the material within the path 14 the material is shaped into a complete circle.

Figure 20:
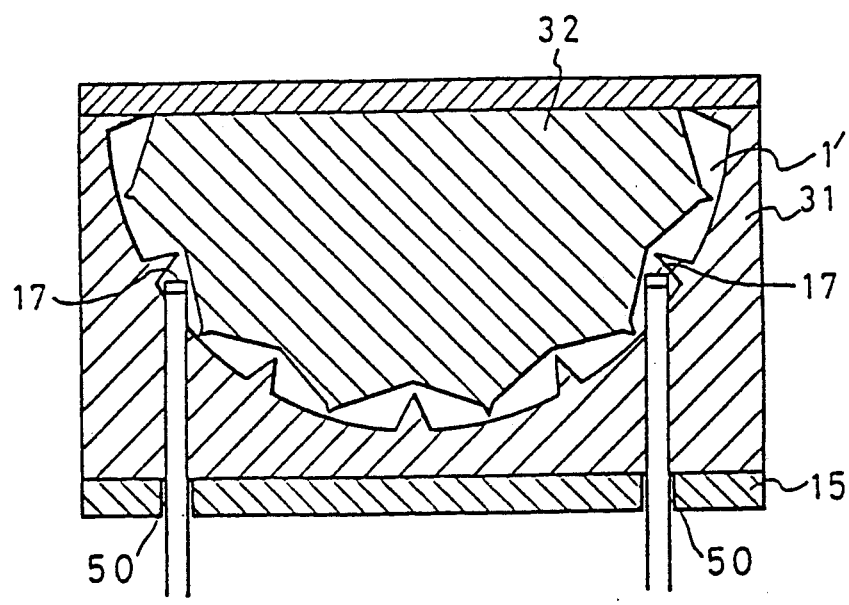
FIG. 20 is a sectional view of the forming path.
Figure 21:
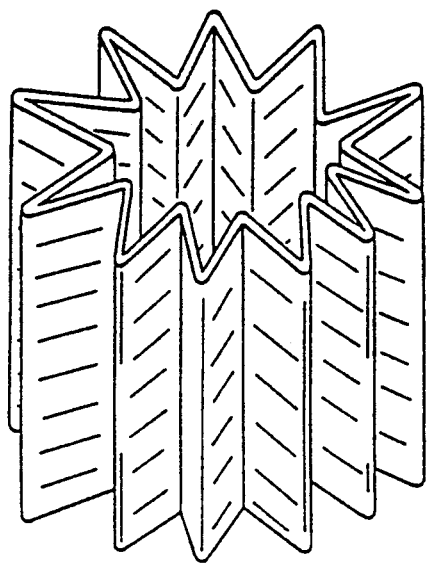
FIG. 21 is a perspective view showing a conventional type filter element.
Figure 22:
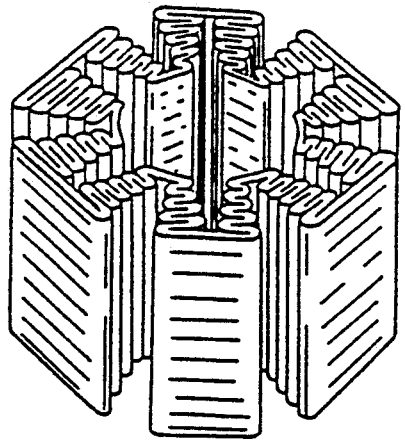
FIG. 22 is a perspective view showing a crystal type filter element formed by the present invention.

As shown in FIG. 20, the top portion of the conveying hook 17 is inserted into the forming path 14. The material 1 is held within the space 1' formed between a core member 32 and an outer wall member 31.

As described above, the material 1 is conformed from the shape shown in FIG. 17a to the shape shown in FIG. 17n. It should be noted that every phase of material shown in FIGS. 17a-17n has a plurality of wavy portions such as shown in FIGS. 17a and 17n. The plurality of wavy portions of the material 1 are not shown in FIGS. 17b-17n to simplify these FIGS. Namely, the lines of FIGS. 17b-17m represent the outer portion of the concave and the convex portions of the material 1.

Conveying mechanism 51 of the conveying bar 34 is explained with reference to FIG. 19. The base plate 15 is supported by a stand 18 which mounts on a fixed beam 33. A pilot bar 23 is supported at the center portion of the fixed beam 33, and the slider 35 is slidably connected with the pilot bar 23. A vertical slider 20 is fixed on the slider 35, and a contact member 21 which is connected at the center portion of the conveying bar 34 is slidably held within a groove formed in the slider 20. A moving shaft 36 is provided under the fixed beam 33, and a cam 25 is connected with the moving shaft 36 so that a sector 24 which is mechanically connected with a rack formed under the surface of the slider 35 is swung in accordance with the movement of the moving shaft 36. The conveying bar 34 is reciprocated by the rotation of the moving shaft 36 via the cam 25, the slider 20 and the contact member 21.

A pair of cams 28a and 28b are fixed to the moving shaft 36, and the vertical pilot bars 26a and 26b are connected with the cams 28a and 28b via the contact members 29a and 29b respectively. The vertical pilot bars 26a and 26b reciprocate vertically within boss portions 27a and 27b which are fixed to the fixed bar 33 in accordance with the rotation of the moving shaft 36. Sliders 52a and 52b are connected with the upper end of the vertical pilot bars 26a and 26b, and the sliders 52a and 52b are slidably connected with horizontal pilot bars 53a and 53b which are fixed under the conveying bar 34. Thereby, the rotation of the moving shaft is transferred to the conveying bar 34 via the cams 28a and 28b, the vertical pilot bars 26a and 26b, and the sliders 52a and 52b so that the conveying bar 34 reciprocates vertically in accordance with the rotation of the moving shaft 36.

The vertical movement of the conveying bar 34 is designed so the conveying hook 17 is inserted into the forming path 17 through the groove 50 when the conveying bar 34 is elevated, and the conveying hook is completely detached from the forming path 14 when the conveying bar 34 moves downwardly. The distance of the horizontal movement of the conveying bar 34 is designed so the distance is equal to the distance between adjacent pairs of the conveying hooks 17. Each cycle of the operation of the conveying bar 34 includes elevating, advancing, sinking and retreating.

The distance between grooves 50 is varied as shown in FIG. 18 in order to adjust the width of the forming path 14.

As described above, the rounding step of the present embodiment is carried out while the material is conveyed within the forming path by the reciprocating movement of the conveying hook, so that the material can be rounded.

Since the present embodiment employs the steps of bending the tape like material to serpentine shape by passing the material through pairs of rollers, cutting the material by a predetermined length while the material is guided, transferring the material into the reducing drum while the wavy shape of the material is preserved and rounding the material by conveying the material through the forming path, the crystal type filter elements can be effectively produced from a tape like material automatically.

While the invention has been described in connection with what is considered to be the most practical preferred embodiments, the applicant does not limit the invention to the disclosed embodiment but, on the contrary, intends the invention to cover various modifications and equivalent arrangements included within the spirit and scope of the appended claims.

What is claimed is:

1. A method for bending and cutting a tape-like material defined by a width, comprising the steps of:
   repeatedly bending the tape-like material along the tape-like material in a direction parallel to the width of the material by conveying the material through a plurality of forming and cutting rollers each having circumferentially spaced concave and convex portions to create corrugated portions having successive bends at gradually varying distances from one another along the material defining a pitch and a gradually varied amplitude, the gradually varied amplitude defining maximum amplitudes and minimum amplitudes of the corrugation, and
   cutting the material while the material is held abutting the outer surfaces of said rollers, said cutting being carried out by a first cutting step for cutting a predetermined part of the width of the material so that the material is not separated and a second cutting step for cutting the remaining part of the width of the material so that the material is completely separated.

2. A method for bending and cutting a tape-like material claimed in claim 1, wherein
   the material is conveyed by holding the material against said plurality of forming and cutting rollers.

3. A method for bending and cutting a tape-like material claimed in claim 2, wherein
   the material is held against said rollers by a guide plate, comparing swinging said guide plate so that a distance between the outer surface of said forming and cutting rollers and the facing surface of said guide plate is kept constant.

4. An apparatus for bending and cutting a tape-like material, comprising:
   two pairs of forming and cutting rollers each having a plurality of circumferentially spaced concave and convex portions at an outer surface thereof for bending said tape-like material to a corrugated shape having successive bends at gradually varying distances from one another along the material defining a pitch and a gradually varied amplitude, while said tape-like material is passed between said pairs of forming and cutting rollers, said gradually varied amplitude defining maximum and minimum amplitudes of said corrugated material, a first pair of cutters positioned in said first pair of forming and cutting rollers for cutting a predetermined portion of the material along an axial direction thereof and a predetermined part of the material along the width thereof, and a second pair of cutters positioned in said second pair of forming and cutting rollers for cutting the same portion of the material along the longitudinal direction where said first pair of cutters cut and the remaining part of the width of the material so that the material is separated by the second pair of cutters.

5. An apparatus for bending and cutting a tape-like material claimed in claim 4, further comprising:

a guide plate for an idle roller, guiding the transmitting of the material from one of said idle roller and one of said forming and cutting rollers to the other of said idle roller and one of said forming and cutting rollers, said guide plate being functionally connected to one of said idle roller and said one of said forming and cutting rollers so that said guide plate swings synchronously with the rotation of said functionally connected one of said idle roller and said one of said forming and cutting rollers.

6. An apparatus for bending and cutting a tape-like material claimed in claim 5, wherein said functionally connected one of said idle roller and said one of said forming and cutting rollers has a varying radius, and said guide plate swings so that a distance between the outer surface of said functionally connected one of said idle roller and said forming and cutting rollers and the facing surface of said guide plate is kept constant.

7. An apparatus for bending and cutting a tape-like material, comprising:

at least one pair of forming and cutting rollers for forming and cutting the tape-like material having an outer surface with a plurality of circumferentially spaced concave and convex portions, adjacent pairs of said concave and convex portions defining a roller surface corresponding to the corrugated portions to be formed from a tape-like material, said rollers bending said tape-like material to a corrugated shape having successive bends at gradually varying distances from one another along the material to define gradually varying material amplitudes and a material pitch corresponding to the outer surface of said rollers, each of said forming and cutting rollers including an annular groove formed in the outer surface thereof, and a guide plate provided between adjacent forming and cutting rollers for guiding the material, a pair of said guide plate being received in said annular groove.

* * * * *